April 11, 1933. H. W. ADEY 1,903,665

RADIO RECEIVING AND TRANSMITTING APPARATUS

Filed Oct. 3, 1929

INVENTOR
Horace W. Adey,
BY
ATTORNEY

Patented Apr. 11, 1933

1,903,665

UNITED STATES PATENT OFFICE

HORACE WILLIAM ADEY, OF LONDON, ENGLAND

RADIO RECEIVING AND TRANSMITTING APPARATUS

Application filed October 3, 1929, Serial No. 397,092, and in Great Britain October 24, 1928.

This invention relates to radio receiving and transmitting apparatus of the kind wherein what is termed a loop or frame aerial is employed i. e. an aerial consisting of an open coil arranged, e. g. around the case containing the remaining apparatus of the set.

According to my invention, in order to obviate the use of a variable inductance of one of the types in general use, the loop or frame aerial is utilized as one of the coils of such inductance, the other coil being arranged so as to be capable of being turned or otherwise moved so as to vary the mutual inductance between it and the frame aerial. This movable coil, which may have one or more turns and may be of any desired resistance, is connected in the circuit of the apparatus in any suitable manner, for example, it may be connected between the high tension battery and the grid or plate of the valve or of one valve of a series of valves, or it may be connected between the high tension battery and a transformer. Or it may be connected on one side to the high tension loud speaker or phone terminal and on the other side to the grid or plate of the valve or to the transformer.

By this means, very considerable simplification of the radio circuit is obtained, for example, it renders unnecessary the tapping of the loop or frame aerial in order to obtain reaction, or the use of a neutro-vernier, or of an additional variable condenser. Furthermore, the volume of sound obtained in a loud speaker is much greater than that obtainable heretofore with the same plate current and the set is rendered more selective, i. e. is much easier to control.

The movable coil of the variable inductance, when arranged inside the aerial, advantageously consists of a coil which is mounted to turn about a diameter that lies substantially in the plane of the loop or frame aerial, such coil being mounted to turn in suitable bearings and being provided with a milled head or other suitable means extending or partly extending to the exterior of the casing, whereby it may be rotated.

In another form or modification of my invention, the said movable coil may be arranged at the exterior or interior of the casing containing the loop or frame aerial, such coil being mounted on a stem provided with concentric contacts adapted to be fitted plugwise into a corresponding socket in the casing. By providing a series of such coils having similar plug contacts, provision may be made for varying the wave length of the reception or transmission as desired. Moreover by turning such coil in its sockets the inductance between such coils and the loop or frame aerial can be varied as desired.

In the accompanying drawing which shows by way of example how the invention may be carried into practice.

Figures 6 and 7 are detail views hereinafter referred to.

Figure 1:
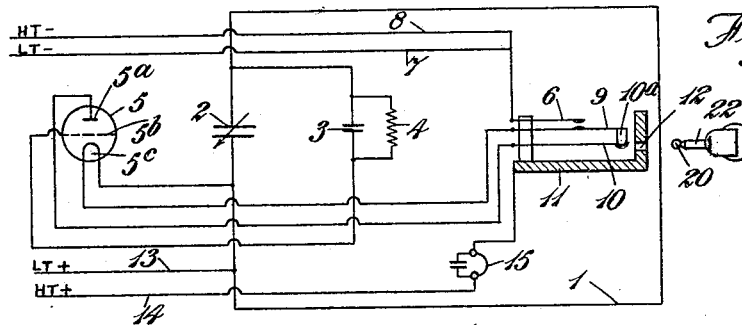
Figures 1 and 2 are diagrams of circuit of receiving sets embodying the invention.

As shown in Figure 1, a frame aerial 1, having a variable condenser 2 arranged therein, is connected to a fixed condenser 3 and a resistance or grid leak 4 which are arranged in parallel, the fixed condenser and resistance being connected to the grid 5b of a detector valve 5.

A switch which can simultaneously close two circuits is provided comprising a leaf spring 6 to which a low tension negative lead 7 and a high tension negative lead 8 are connected, a leaf spring 9 connected to a terminal of the filament 5c of the valve, a third leaf spring 10 which is connected to the plate 5a of the valve and a metal bracket 11 provided with a socket 12.

The second terminal of the filament 5c of the valve is connected to the frame aerial 1 to which the positive low tension lead 13 is also connected. The high tension positive lead 14 is connected to reproducing apparatus 15 such for example as a set of headphones or a loud speaker, which is also connected to the bracket 11 of the switch.

A coil 16 for use with the set is mounted upon a coil holder 17 of insulating material, and has one end thereof connected to a metal strip 18 secured upon an insulated metallic rod 19 which terminates in a ball head 20. The other end of the coil is secured to a metal strip 21 which is maintained in electrical contact with a tubular metal member 22, said tubular member and the strip 21 being insulated from the rod 19 and strip 18 by washers 23 of insulating material.

Upon insertion of the plug formed by the ball head 20 and the tubular member 22 into the socket 12, the leaf spring 10 and the ball head 20 are brought into electrical contact with one another as are also the tubular member 22 and the bracket 11. Insertion of the plug into its socket causes a displacement of the spring 10 and this movement is communicated by an insulating stud 10a to the spring 9 which is moved into contact with the leaf spring 6. Thus by the insertion of the plug two circuits are simultaneously closed, the first circuit from the low tension positive lead 13 to the low tension negative lead 7 including the frame aerial 1, the filament 5c of the valve and the leaf springs 9 and 6, whilst the second circuit from the high tension positive lead 14 to the high tension negative lead 8 comprises the headphones 15, bracket 11, tubular member 22, metal strip 21, coil 16, metal strip 18, rod 19, leaf spring 10, valve plate 5a, filament 5c and leaf springs 9 and 6.

Figure 4:
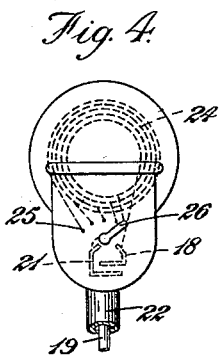
Figure 4 is an elevation of a modified arrangement of coil holder.

The coil 16, which is movable relatively to the frame aerial 1 in order to vary the reactance between the aerial and the coil, may consist of a single loop or convolution of steel, copper, brass or other suitable metal; or it may consist of a coil having any desired number of convolutions in close or open winding; or it may be wound part one way and part the other way with a central tapping. In order to vary easily the number of operative convolutions of the coil, a tapped coil 24, Figure 4, may be employed which is connected to a series of metal studs or contact points 25 which cooperate with a switch arm 26 connected to the strip 21. The switch and studs may be arranged at any convenient position upon the coil holder.

Figure 2:
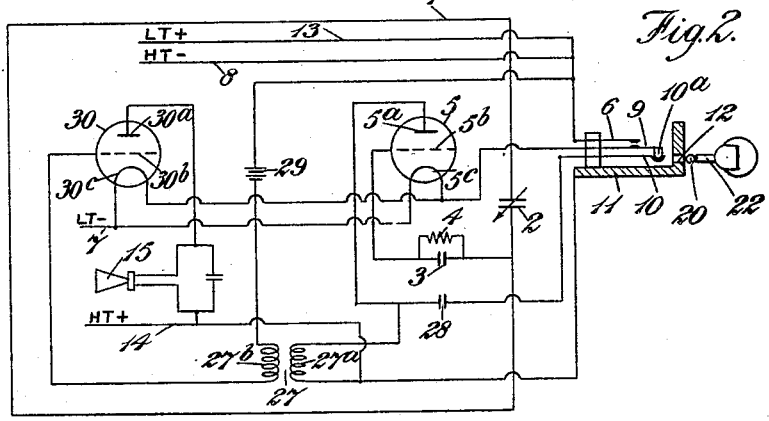
Figure 3:
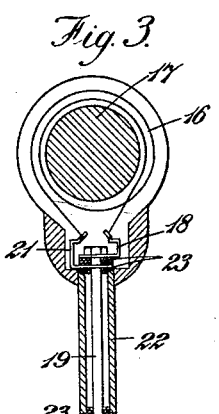
Figure 3 is a sectional view of a coil and coil holder.

Figure 2 shows a circuit of a receiving apparatus having a stage of low frequency amplification arranged therein. The aerial 1 is connected to the grid 5b of the detector valve 5 in a manner similar to that shown in Figure 1, the plate 5a of the valve being connected to the primary winding 27a of a transformer 27, and also to a condenser 28 which is also connected to the leaf spring 10 of the switch. Leaf spring 6 of the switch is connected to the high tension negative lead 8, the low tension positive lead 13 and a positive lead from a grid bias battery 29, whilst the spring 9 is connected to the filament 5c of the detector valve 5 and the filament 30c of a low frequency valve 30 and the bracket 11 is connected to the primary winding 27a of the transformer 27. The secondary winding 27b of the transformer is connected to the grid bias battery 29 and also to the grid 30b of the valve 30, the plate 30a of the said valve being connected to a reproducing apparatus 15, and the high tension positive lead 14 being connected to the reproducing apparatus 15 and also to the primary winding 27a of the transformer 27.

It is to be understood that this invention is not limited to use with the circuits as shown, and the position in the circuit of the coil 16 can be varied. For instance, when more than one valve is used, one terminal of the said movable coil may be connected between the high tension battery and a transformer, or it may be connected on one side to a high tension loud speaker or 'phone terminal and on the other side to the grid or plate of a valve or to a transformer.

When one terminal of the said movable coil is connected to one terminal, e. g. the positive terminal of the high tension battery, the other terminal may be connected through a condenser, the capacity of which can be varied, to the plate of the first valve of a series or in cases where there is only one valve to the plate of such valve. In cases where there is a plurality of valves, the high tension battery is advantageously also connected to one terminal of the primary of a transformer the other primary terminal being connected to the plate of the first valve.

In cases where only one movable coil is employed which is arranged for example, in the interior of the casing, the condenser above mentioned is made of variable capacity, for example, in three sections, connected respectively to a multi-point switch so that by suitably adjusting the switch any desired number of sections of the condenser can be connected in parallel or in series in the circuit. In cases where a number of interchangeable movable coils such as those above mentioned are provided, it will in most cases be unnecessary to provide for varying the capacity of this condenser.

Figure 5:
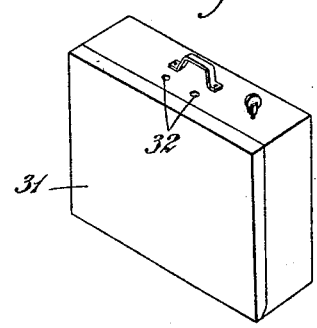
Figure 5 is an isometric view of a casing for a portable set.
Figure 6:
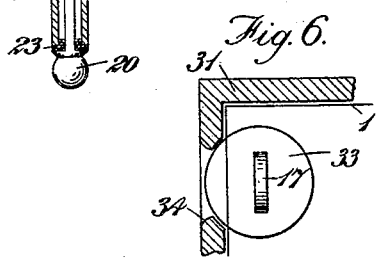
Figure 7:
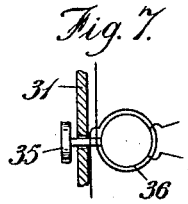

If desired the movable coil may be mounted upon the exterior of a casing 31 in which the set is arranged as shown in Figure 5, and if desired two sockets 32 may be also provided to receive the terminals of a loud speaker or of a pair of head 'phones. The coil however, may be mounted within the casing as shown in Figures 6 and 7, in which case the coil holder 17 may have secured thereto a control disc 33 which projects through an aperture 34 formed in the casing or it may have a spindle 35 secured thereto which projects through the casing and has a control head or knob mounted thereon.

The aerial may be of any desired form, and may be provided with a loop or loops 36 therein to extend around the movable coil.

Instead of turning the movable coil as above mentioned, it may be made movable rectilinearly or in a curved path, e. g. by mounting it on a carriage or frame capable of sliding in suitable guides, so as to move in a direction transverse to or in the plane of the loop or frame aerial. The movable coil may be made of any size even of similar size to the aerial itself, or some movable or stationary turns of wire may be arranged around the aerial, and wound in the same or opposite direction thereto, such turns being in series with a movable coil.

If desired the loop or frame aerial 4 can be used in conjunction with an indoor or outdoor aerial and earth in a known manner. It is to be understood moreover that as many stages of high and/or low frequency amplification as is desired may be included in the apparatus according to this invention.

I claim:

1. A radio receiving apparatus comprising a frame aerial, a variable condenser to the opposed plates of which the ends of the aerial are respectively connected, a detector valve provided with a grid, plate and filament, a grid leak and a condenser in parallel and connected in series with said aerial and the grid and filament of said valve, a sound reproducing means, a multiple contact switch having contacts in series with the said sound reproducing means and the plate and filament of the valve and sources of electrical energy, a jack plug, a reactance coil that is mounted on said jack plug and rotatable therewith around an axis that is longitudinal of the jack plug and is diametrical of the coil, said coil being insertable in the output circuit of the apparatus in inductive relationship with the frame aerial, a jack, said jack plug on which the coil is mounted being insertable in the jack to close the switch.

2. A radio receiving apparatus comprising a frame aerial, a variable condenser to the opposed plates of which the ends of the aerial are respectively connected, a detector valve provided with a grid, plate and filament, a grid leak and a condenser in parallel and connected in series with said aerial and the grid and filament of the valve, a sound reproducing means, a multiple contact switch having contacts in series with said sound reproducing means and the plate and filament of the valve, a jack plug, a tapped reactance coil which is mounted on said jack plug and is rotatable therewith, a jack, said jack plug upon insertion into said jack causing insertion of the coil in the output circuit of the apparatus and closing of the switch, the said coil being movably mounted to vary the mutual inductance between said coil and the aerial, and means for controlling the number of windings of the coil to be arranged in the output circuit.

3. A radio receiving apparatus, comprising a detector valve having a plate, a filament and a grid, a frame aerial and a variable condenser in an oscillatory circuit in series with the grid of the valve, an output circuit that includes the plate and filament of the valve, circuits for energizing said valve, leaf springs arranged in the said output and energizing circuits, a jack arranged adjacent said leaf springs, a jack plug that actuates said leaf springs to close the output and energizing circuits upon its insertion into the jack, a coil mounted on said jack plug and rotatable therewith that is inserted into the output circuit by insertion of the jack plug into the jack and is in inductive relationship with the frame aerial, and a sound reproducing means associated with the output circuit.

HORACE WILLIAM ADEY.